US008596596B2

(12) United States Patent
Naji et al.

(10) Patent No.: US 8,596,596 B2
(45) Date of Patent: Dec. 3, 2013

(54) MOTOR SUPPORT DEVICE FOR HEATING, VENTILATION AND/OR AIR-CONDITIONING SYSTEM

(75) Inventors: Said Naji, Elancourt (FR); Patrick Duputel, Cormeilles en Parisis (FR); Pascal Touitou, Gouvieux (FR); Philippe Vincent, Epemon (FR); Peter Zisko, Dubec (CZ); Ralph Stroehla, Coburg (DE); Laurent Legot, Paris (FR); Csaba Gyurian, Velky Cetin (SK)

(73) Assignee: Valeo Systemes Thermiques, Les Mesnil Saint Denis, Cedex (FR)

( * ) Notice: Subject to any disclaimer, the term of this patent is extended or adjusted under 35 U.S.C. 154(b) by 20 days.

(21) Appl. No.: 12/354,177

(22) Filed: Jan. 15, 2009

(65) Prior Publication Data
US 2009/0189052 A1 Jul. 30, 2009

(30) Foreign Application Priority Data

Jan. 15, 2008 (FR) ...................................... 08 00212

(51) Int. Cl.
A47B 96/00 (2006.01)
(52) U.S. Cl.
USPC ...................... 248/224.7; 248/230.1; 248/315
(58) Field of Classification Search
USPC ......... 248/602, 603, 632, 637, 644, 645, 672, 248/675, 678, 310, 314, 315, 634, 638, 248/224.7, 230.1, 311.2, 605, 621; 310/51, 310/91; 417/360, 363; 16/2.5
See application file for complete search history.

(56) References Cited

U.S. PATENT DOCUMENTS

| 1,915,466 | A | * | 6/1933 | Lilly | 248/180.1 |
|---|---|---|---|---|---|
| 3,396,925 | A | * | 8/1968 | Dickie et al. | 248/634 |
| 3,565,386 | A | * | 2/1971 | Lemkuil et al. | 248/573 |
| 4,161,667 | A | * | 7/1979 | Buckman et al. | 310/51 |
| 4,482,124 | A | * | 11/1984 | Dochterman | 248/604 |
| 4,766,587 | A | * | 8/1988 | Dons et al. | 720/698 |
| 4,768,925 | A | * | 9/1988 | Geupel | 415/213.1 |
| 5,110,081 | A | * | 5/1992 | Lang, Jr. | 248/635 |
| 5,470,207 | A | * | 11/1995 | Shockey et al. | 417/313 |

(Continued)

FOREIGN PATENT DOCUMENTS

FR 2933246 A1 * 1/2010

OTHER PUBLICATIONS

Kamek.com, "Overmolding, the Advantages Include Improved Product Design and Durability", Kamek Precision Tools, Inc., 2008, Last accessed Jul. 19, 2011, http://www.kamek.com/overmolding/default.aspx.*

*Primary Examiner* — Terrell McKinnon
*Assistant Examiner* — Eret McNichols
(74) *Attorney, Agent, or Firm* — Howard & Howard Attorneys PLLC (57) ABSTRACT

The invention relates to a support device (1) of a motor of a blower. The support device (1) comprises a base (2), a ring (3) which extends according to an axis and which is able to house the motor. The support device (1) also comprises at least a decoupling means (4) which connects the base (2) and the ring (3). The ring (3) comprises a first face (5) extending according to the axis and the base (2) comprises a second face (10) extending according to the axis. The decoupling means (4) is interposed between the first (5) and the second (10) faces. The decoupling means may have an "H" shape in order to absorb the vibrations caused by the motor.

18 Claims, 5 Drawing Sheets

(56) References Cited

U.S. PATENT DOCUMENTS

| | | | |
|---|---|---|---|
| 5,482,444 A * | 1/1996 | Coha et al. | 417/363 |
| 5,875,816 A * | 3/1999 | Frank et al. | 137/549 |
| 6,045,112 A * | 4/2000 | Kirkwood | 248/634 |
| 6,076,795 A * | 6/2000 | Scheidel et al. | 248/603 |
| 6,279,866 B1 * | 8/2001 | Eilemann et al. | 248/638 |
| 6,343,782 B1 * | 2/2002 | Honlinger et al. | 267/136 |
| 6,897,580 B2 * | 5/2005 | White | 310/51 |
| 7,056,102 B2 * | 6/2006 | Cremer et al. | 417/363 |
| 7,510,164 B2 * | 3/2009 | Geroux et al. | 248/638 |
| 7,566,998 B2 * | 7/2009 | Winkler et al. | 310/51 |
| 8,167,541 B2 * | 5/2012 | Park et al. | 415/119 |
| 2001/0019098 A1 * | 9/2001 | Guyomard | 248/562 |
| 2004/0032177 A1 * | 2/2004 | Nitzsche et al. | 310/91 |
| 2004/0169118 A1 * | 9/2004 | Talaucher et al. | 248/314 |
| 2006/0038106 A1 * | 2/2006 | Geroux et al. | 248/603 |
| 2006/0125330 A1 * | 6/2006 | Winkler et al. | 310/51 |
| 2007/0116581 A1 * | 5/2007 | Hagist et al. | 417/360 |

* cited by examiner

MOTOR SUPPORT DEVICE FOR HEATING, VENTILATION AND/OR AIR-CONDITIONING SYSTEM

RELATED APPLICATIONS

This application claims priority to and all the advantages of French Patent Application No. 0800212, filed on Jan. 15, 2008.

BACKGROUND OF THE INVENTION

This invention relates to the field of motor support devices for motor vehicle heating, ventilation and/or air-conditioning systems. More specifically, the invention relates to a support device including means for decoupling motor vibrations.

In a heating, ventilation and/or air-conditioning system, the air flow circulating in it is propelled by a blower wheel driven in rotation by a motor. The implementation of the blower wheel and the motor create vibrations. These vibrations are the source of sound and vibration (imbalance) disturbances, in the vehicle interior, of the motor housed in a motor support. The vibrations are transmitted via the motor support to the entire heating, ventilation and/or air-conditioning system and create acoustic waves that interfere with the comfort of vehicle passengers.

DESCRIPTION OF THE PRIOR ART

To overcome this, decoupling means have been provided between the motor and the motor support or between a ring housing the motor and the motor support. These decoupling means are effective only for a certain type of vibrations and do not enable the transmission of any type of vibrations to the heating, ventilation and/or air-conditioning system to be prevented. However, when a motor drives a blower wheel, a number of phenomena add up and cause a multitude of different vibrations. First, the imbalance of the wheel causes a radial movement of the motor that should be avoided. Second, a "pumping" phenomenon due to the suction of air by the blower wheel as well as the deformation of the wheel causes an axial movement of the motor. Finally, as the motor drives the blower wheel by rotation, a pitching movement or so-called tangential movement of the motor is created. Moreover, depending on the position of the motor in the heating, ventilation and/or air-conditioning system, i.e. depending on the horizontal or vertical position of the motor shaft, the phenomena mentioned above are more or less intense. Consequently, a choice is made regarding the type of vibration dealt with by the decoupling means. An example is document U.S. Pat. No. 6,279,866. This document presents two embodiments. The first embodiment involves decoupling of the motor from the motor support for radial vibrations of the motor. The other embodiment involves decoupling the motor from the motor support for axial vibrations of the motor.

This is not satisfactory from the perspective of standardization of the decoupling means used or from the perspective of its location in the motor support device. The decoupling means of the prior art are not suitable for decoupling the motor from the motor support regardless of the position of the motor, i.e. whether the motor is in the horizontal or the vertical position. Moreover, not all of the sound disturbances created by this multitude of vibrations are dealt with. The comfort of passengers in the vehicle is therefore not optimal.

SUMMARY OF THE INVENTION

The invention is intended to improve this situation.

To do this, the invention relates to a motor support device including a base, a ring extending according to an axis A and capable of housing a motor with an axis that substantially coincides with axis A of the ring, and at least one decoupling means connecting the base and the ring, in which said ring has a first face that extends according to axis A, and said base has a second face that extends according to axis A. The decoupling means are interposed between the first and the second faces.

Other features of some preferred embodiments of the present invention are listed below:
the decoupling means is a generally parallelepiped contact including a first side in direct contact with the ring, a second side in direct contact with the base and a free third side extending in an axial plane with respect to the axis of the motor, in which the third side has at least one recess extending in a direction parallel to the axis A.
the decoupling means includes a fourth side having at least one recess. The specific structure of the decoupling means ensure the decoupling between the motor and the motor support regardless of the type of vibrations caused by implementation of the motor and the blower wheel. Thus, the axial and tangential vibrations are absorbed by the decoupling means. In this way, a very clear improvement in the comfort of vehicle passengers is achieved since none of the sound disturbances are created any longer. The recess created in a direction parallel to the axis A causes a flexibility of the decoupling means with respect to an axial constraint and a tangential constraint while maintaining the rigidity of the decoupling means with respect to a radial constraint. An advantage of this particular structure is that it overcomes the loss in damping properties of the material used for the decoupling means at low temperature.
the decoupling means has an H shape.
at least two decoupling means are distributed according to at least two distinct radial planes.
the radial planes are located one with respect to the other so that between them is the center of gravity location of a motor the ring is capable of housing. Thus, the motor can be arranged in the heating, ventilation and/or air-conditioning system in a horizontal or a vertical position. The particular arrangement of the radial planes standardizes the support device, leading to a reduction in production costs.
each decoupling means of a first radial plane is offset by an angle of between 0 and 120° with respect to decoupling means of a second radial plane.
each radial plane includes three decoupling means distributed with an angular offset of 120°. The particular distribution of the decoupling means involves a uniformity of the forces exerted on the decoupling means. In this way, the damping or attenuation of the vibrations created by the motor during implementation thereof is optimal.
it includes six decoupling means.
a hood is associated with the base in order to form a motor support.
the hood and the base are made in one piece.
the base, the ring and the decoupling means form a single part.
the part is plastic.

The invention also relates to a process for producing the support device including the following steps:
a) molding the ring and the base with a first plastic material
b) over-molding the decoupling means with a second plastic material.

BRIEF DESCRIPTION OF THE DRAWINGS

Other features and advantages of the invention will appear on examination of the following detailed description, and the appended drawings, in which:

FIG. 2b is a top view of FIG. 2a, FIG. 3 is a perspective view of the ring 3 according to the first embodiment of the invention.

The appended drawings may serve not only as a complement to the invention, but also contribute to its definition, where appropriate.

DETAILED DESCRIPTION OF EXEMPLARY EMBODIMENT(S)

Figure 1:
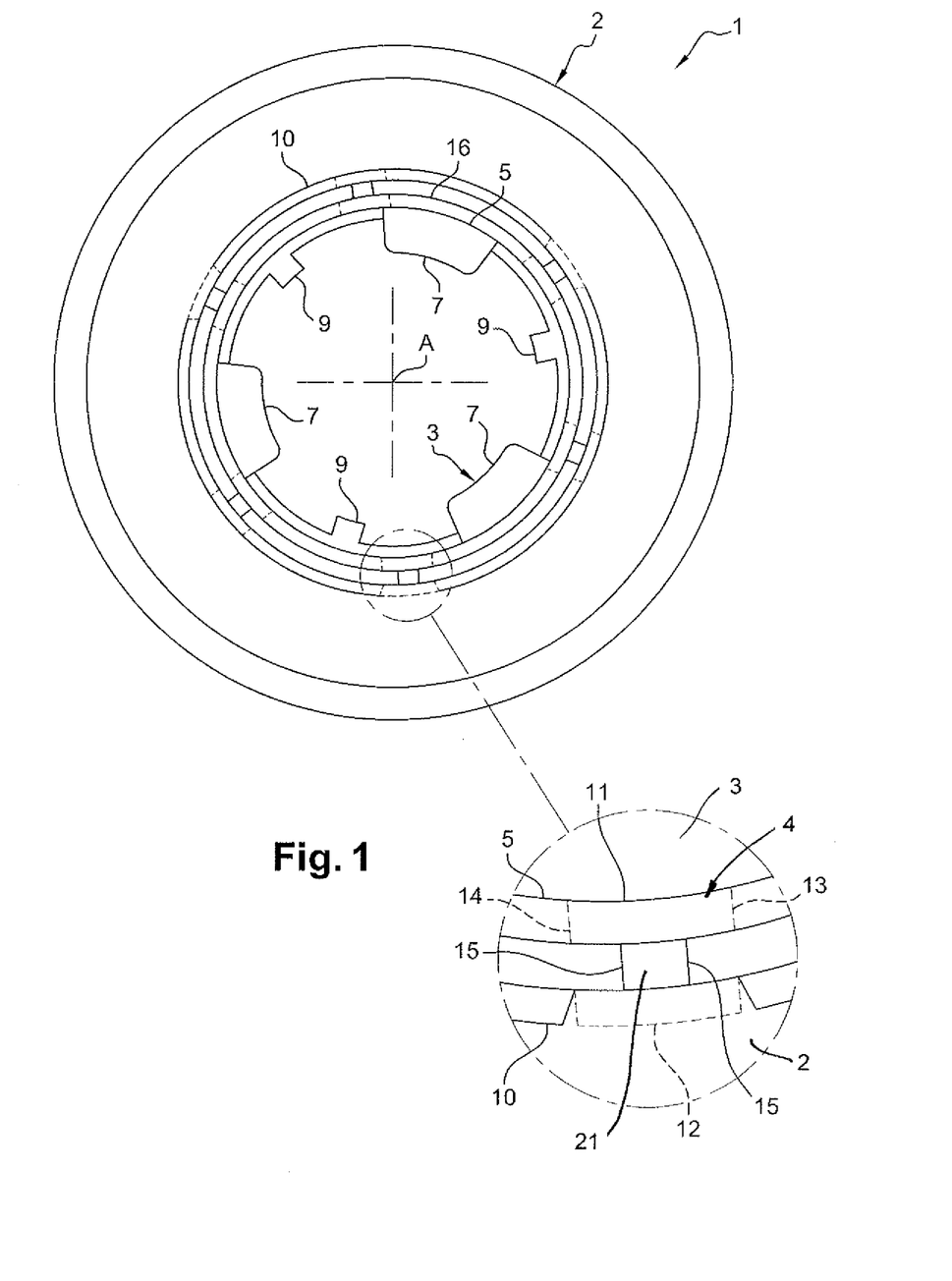
FIG. 1 is a top view of the support device according to a first embodiment.

FIG. 1 shows the support device 1 according to a first embodiment. The support device 1 includes a base 2, a ring 3 and decoupling means 4.

The ring 3 is a hollow cylinder. It extends according to an axis A and is capable of housing a motor with an axis that substantially coincides with axis A of the ring 3. By "extend", we mean that the length of the cylinder has a direction parallel to that of the axis A. The motor, not shown, causes the rotation, during implementation, of a blower wheel housed in a housing. This blower wheel creates an air flow passing through the heating, ventilation and/or air-conditioning system.

The ring 3 has a first face 5 that extends according to the axis A. This first face 5 is the external face of the hollow cylinder. A first end 6 of the ring 3 is open and includes three shoulders 7. These shoulders 7 extend the first end 6 in a radial direction with respect to the axis A. A second open end 8, opposite the first end 6, includes three flexible tabs 9. The shoulders 7 and the flexible tabs 9 keep the motor inside the ring 3.

The base 2 is a hollow cylinder of which the ends are open. The hollow cylinder extends according to the axis A and has a second face 10 that extends according to this axis A. This second face 10 is the internal face of the base 2.

The ring 3 is located inside the base 2 so that the first face 5 of the ring 3 is opposite the second face 10 of the base 2. Nevertheless, the ring 3 and the base 2 are not in direct contact. The ring 3 is kept inside the base 2 by the decoupling means 4.

Figure 1A:
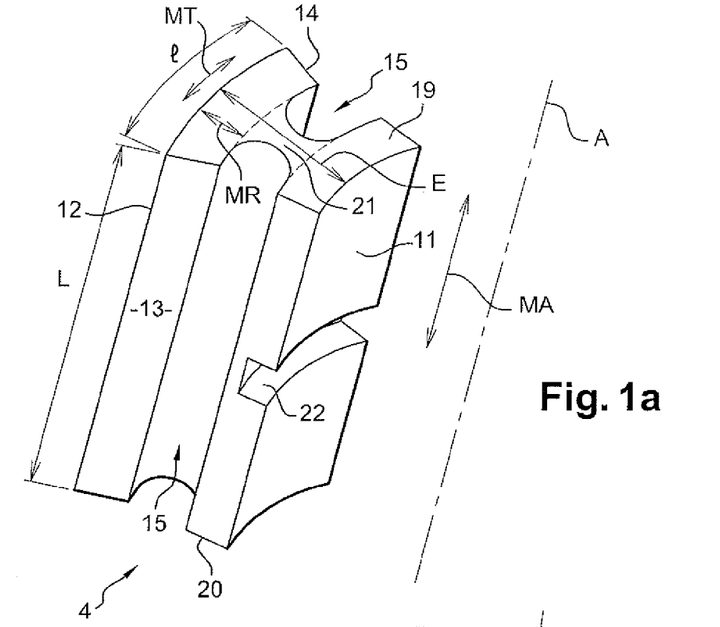
FIG. 1a is a perspective view of the decoupling means according to the first embodiment of the invention.
Figure 2A:
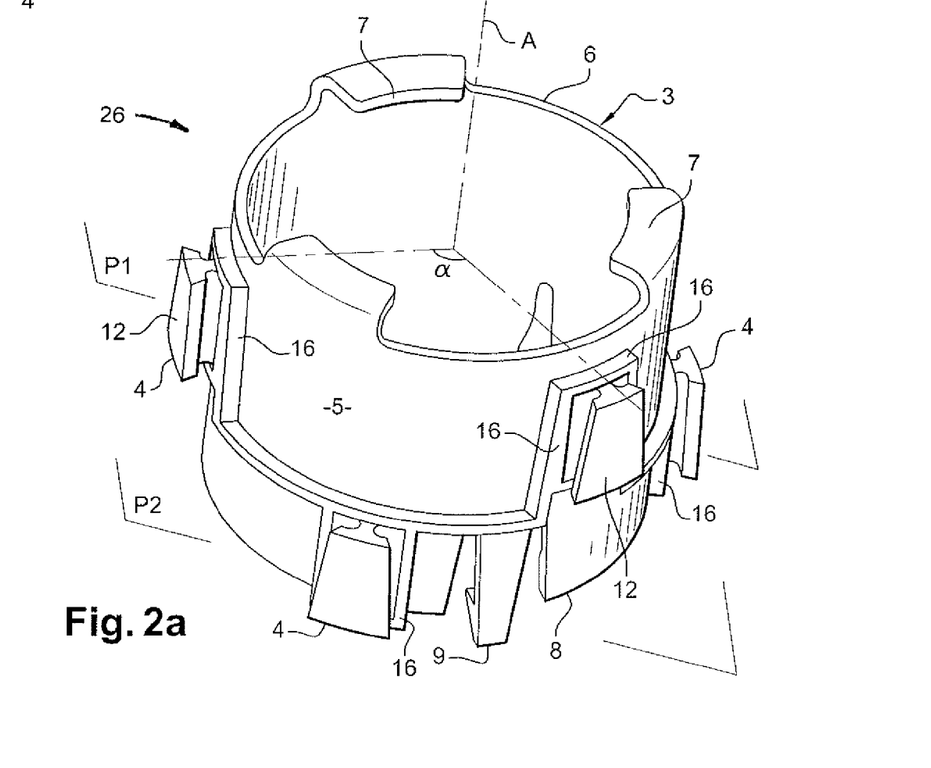
FIG. 2a is a perspective view of the ring equipped with decoupling means according to the first embodiment of the invention.

The decoupling means 4 are contacts. The decoupling means 4 are interposed between the first face 5 of the ring 3 and the second face 10 of the base 2. Each decoupling means 4 may have a generally parallelepiped shape. By "parallelepiped", we mean a hexahedron of which the sides are parallelograms, with the opposite sides being parallel and equal. As shown in FIG. 1a, the generally parallelepiped shape of decoupling means 4 may somewhat approximate a cylindrical sector. Each decoupling means 4 therefore has a first side 11 in direct contact with the first face 5 of the ring 3 and a second side 12 in direct contact with the second face 10 of the base 2. As shown in FIG. 2a, the generally parallelepiped shape of decoupling means 4 may include a trapezoidal portion on which second side 12 is defined. Each decoupling means 4 also includes a free third side 13 extending radially relative to axis A between the first and second sides 11, 12. By "free", we mean that the third side is not in contact with the ring 3 or the base 2. In certain embodiments, the third side 13 may extend in a plane parallel with an axial plane with respect to the axis A. By "axial plane", we mean any plane containing the axis A. This free third side 13 has at least one recess 15 extending in a direction parallel to the axis A. A fourth side 14, opposite the third side 13, includes at least one recess 15 extending in a direction parallel to the axis A. It should be noted that the first 11, the second 12, the third 13 and the fourth 14 sides extend in a direction parallel to the axis A.

These decoupling means 4 ensure the decoupling between the motor, not shown, capable of being housed in the ring 3, and the base 2. More generally, the decoupling means 4 ensure the decoupling between the motor and the heating, ventilation and/or air-conditioning system in which it is integrated.

The decoupling means 4 are made of plastic material. More specifically, the decoupling means 4 are made of a damping material. By "damping", we mean that the plastic material absorbs the vibrations of the motor so as not to transmit them to the base 2. An example of a damping material is natural rubber. The recess 15 formed on the third side 13 and the fourth side 14 gives the decoupling means an H shape from a top view of the support device (FIG. 1). This H shape ensures a decoupling of the motor according to at least three distinct movements.

In FIG. 1a, a decoupling means 4 is shown alone. The decoupling means 4 has a length L, a width l and a thickness E. The third side 13 and the fourth side 14 each have a recess 15. The decoupling means 4 also includes a fifth side 19 and a sixth side 20. The fifth 19 and sixth 20 sides are free and opposite one another. Each recess 15 extends according to the axis A over the entire length of the side on which it is formed. Thus, each recess 15 ends both at the fifth side 19 and at the sixth side 20, giving the decoupling means 4 an H shape from a view parallel to the axis A. In this case, the recess 15 is in the form of a U-shaped groove. Alternatively, a V-shape can be envisaged. Alternatively, as shown in the circled inset portion of FIG. 1, the recesses 15 may be substantially rectangular. The presence of the two recesses 15 forms a trunk 21. This trunk 21 is the portion of the decoupling means 4 that is stressed in order to ensure the decoupling between the motor and the base 2. Indeed, as described below, the first side 11 and the second side 12 of the decoupling means 4 are surrounded by ribs 16 and ridges 17. These ribs 16 form a cradle 23 for each decoupling means 4. Thus, only the trunk 21 of each decoupling means can be deformed when the motor and the blower wheel are implemented. The dimensions of the recesses 15 are chosen so that the trunk 21 can decouple the motor from the base 2. Thus, the thicker the decoupling means 4 is, the more the recesses 15 are superficial. In other words, the width of the trunk 21 is greater than or equal to 20% of the width l of the decoupling means 4. Similarly, the thickness of the trunk 21 is greater than or equal to 20% of the thickness E of the decoupling means 4. A notch 22 is formed on the first side 11 of the decoupling means 4. This notch 22 cooperates with a rib 16 when the decoupling means 4 is over-molded on the ring 3. The rib cooperating with the notch 22 increases the contact surface between the first side 11 and the first face 5 of the ring 3 in order to reinforce the mechanical connection between the decoupling means 4 and the ring 3.

The first movement caused by the implementation of the motor and the blower wheel is an axial movement MA. By "axial movement", we mean a movement in a direction parallel to the axis A. This axial movement is more specifically a so-called pumping movement caused by the rotation of the blower wheel. The trunk 21 of each decoupling means 4 is deformed in a direction parallel to the axis A in order to attenuate this movement. The second movement is a radial movement MR. By "radial movement", we mean a movement in a radial direction with respect to the axis A. The trunk 21 is then compressed and/or decompressed according to its thickness in order to prevent the transmission of this movement to the base 2. The third movement is a tangential movement MT. By "tangential movement", we mean a rotation movement with respect to the axis A. The trunk 21 is also subjected to this movement and is deformed in a clockwise and/or counterclockwise direction with respect to the axis A. Consequently, the decoupling means 4 enables three-dimensional decoupling of the ring 3 subjected to the movements of the motor with respect to the base 2.

Figure 2B:
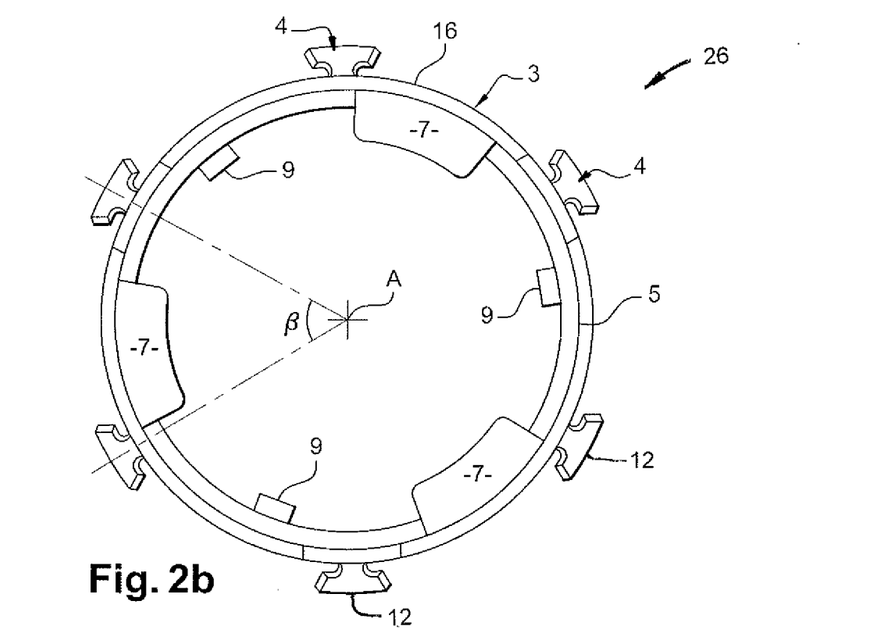

FIGS. 2a and 2b show the ring 3 equipped with decoupling means 4. There are six decoupling means 4 in the first embodiment. Among the six decoupling means 4, at least two decoupling means 4 are distributed according to a first radial plane P1 and at least two decoupling means 4 are distributed according to a second radial plane P2. By "radial plane", we mean any plane orthogonal to the axis A and extending in a radial direction with respect to the axis A. The first P1 and second P2 radial planes are spaced along axis A, as shown in FIG. 2a. As the first radial plane P1 is distinct from the second radial plane P2, the distribution of the plurality of decoupling means forms at least two rows of decoupling means. According to FIG. 2a, three decoupling means 4 are distributed according to the first radial plane P1 and the three other decoupling means are distributed according to the second radial plane P2.

The positions of the radial planes P1 and P2 are chosen so that the center of gravity of the motor, not shown, is between these two radial planes P1 and P2. In other words, the radial planes P1 and P2 are located one with respect to the other so that between them is the center of gravity location of a motor that the ring 3 is capable of housing. Thus, regardless of the position of use of the motor, the motor is always held correctly in the base 2. In other words, whether the axis of the motor is in the horizontal or the vertical position, the distribution of decoupling means 4 ensures that the motor is held in the base 2. The presence of six decoupling means 4 and the distribution of these decoupling means help to improve the standardization of the support device. Indeed, when a support device of the prior art includes only three decoupling means, the center of gravity of the motor can, when the axis of the motor is in the horizontal position, cause a force on a portion of the motor that is not opposed. In this way, the axis of the motor can be tilted with respect to the horizontal, which would cause friction of the blower wheel on the internal wall of the housing containing it. Moreover, it is advantageous to arrange the radial planes P1 and P2 at the ends of the ring 3. In this way, regardless of the motor housed in the ring 3, its center of gravity will be between these two radial planes. Thus, a single ring 3 equipped with decoupling means 4 distributed according to the two radial planes P1 and P2 located at the ends of the ring 3 can be used with motors of identical size but having their respective centers of gravity located differently. The standardization of the support device 1 is thus improved.

The three decoupling means distributed according to the same radial plane P1 or P2 are offset from one another by an angle $\alpha$ of 120° with respect to the axis A. This distribution of the decoupling means of the same radial plane enables a static and dynamic balance of the motor in the planes parallel to the axis A. In general, the angular offset $\alpha$ is determined by the following ration: $\alpha$=360/(number of decoupling means distributed in the same radial plane).

According to the first embodiment, each decoupling means 4 is offset from the adjacent decoupling means by an angle $\beta$ of 60°. This distribution is an improvement with regard to the balance in the plane perpendicular to the axis of the motor. By "adjacent decoupling means", we mean the decoupling means that follows a preceding decoupling means along the first face 5 of the ring 3. In general, each decoupling means 4 of a first radial plane P1 is offset by an angle $\beta$ of between 0 and 120° with respect to a decoupling means 4 of a second radial plane P2.

Figure 3:
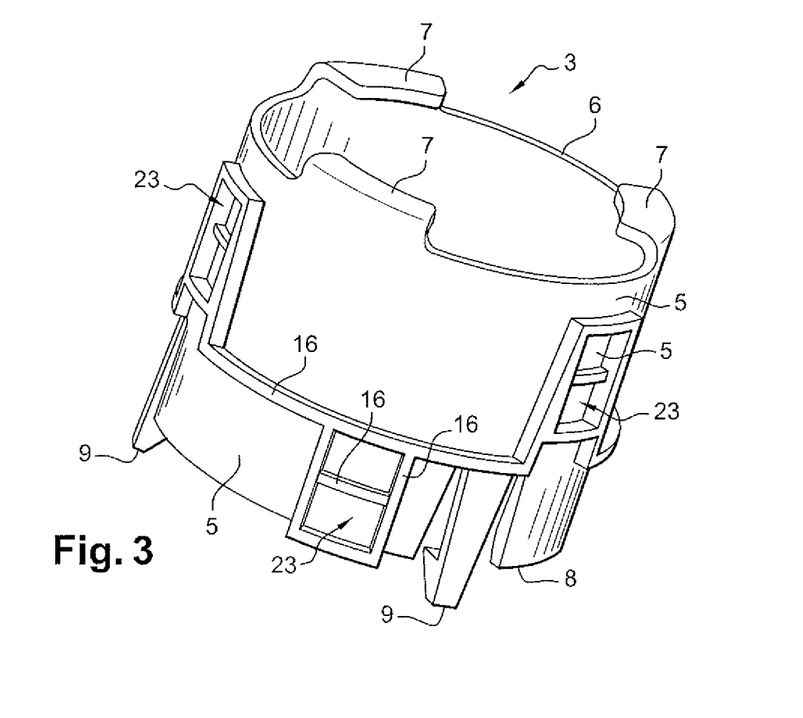

FIG. 3 shows the ring 3 alone. The ribs 16 of the ring 3 surrounding the first side 11 of each decoupling means 4 are arranged on the first face 5 of the ring 3. The ribs 16 form cradles 23. A cradle 23 is shaped so as to receive the first side 11 of a decoupling means 4. Four ribs 16 define a cradle 23 so that it has a rectangular shape. An additional rib 16 is located at the center of the cradle 23. This additional rib 16 cooperates with the notch 22 of the decoupling means 4 so as to reinforce the mechanical strength between the first side 11 of the decoupling means and the first face 5 of the ring 3. The cradles formed by the ribs are involved in the over-molding of the decoupling means 4. The process for producing the support device 1 will be described below.

Figure 4:
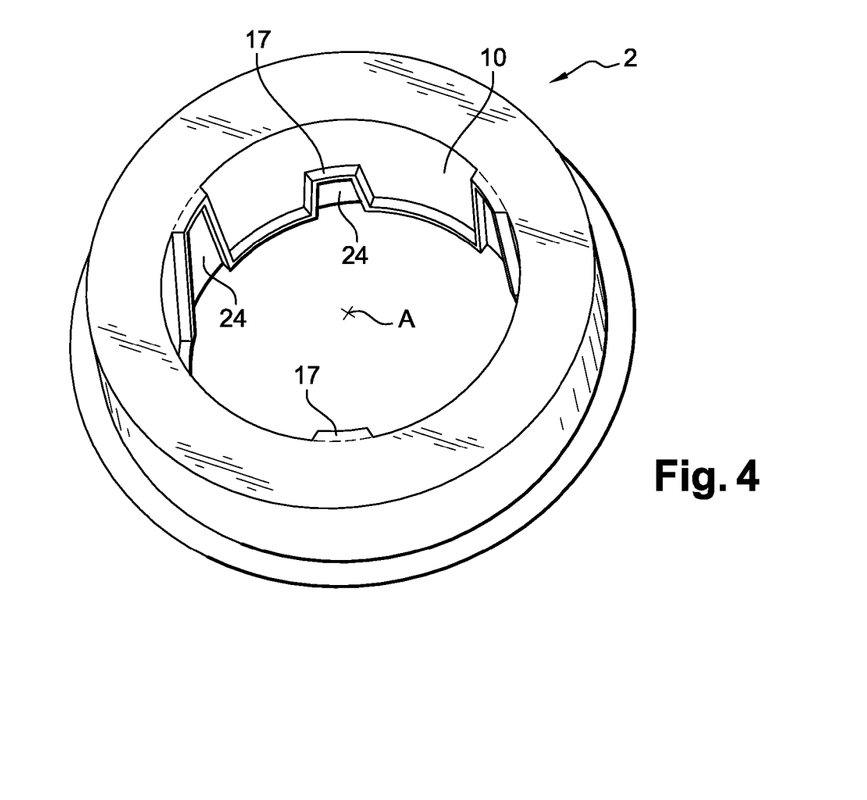
FIG. 4 is a perspective view of the base 2 according to the first embodiment.
Figure 4A:
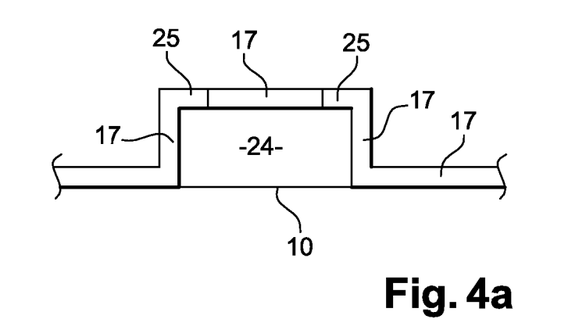
FIG. 4a is a partial cross-section view of the base 2 of FIG. 4.

According to the first embodiment, the ring 3 and the decoupling means 4 are made in one piece. By "in one piece", we mean that the ring 3 and the decoupling means 4 form a single part 26. In this embodiment, the support device 1 is formed by the assembly of the base 2 to the single part 26 by means of the decoupling means 4. According to FIG. 4, on the second face 10 of the base 2, ridges 17 are provided. These ridges 17 partially surround the second side 12 of the decoupling means 4 that is in direct contact with the second face 10. The ridges 17 form housings 24. Each housing 24 is shaped so as to receive the second side 12 of a decoupling means 4. More specifically, each housing 24 is formed by three ridges 17. Thus, one side of the housing is open, i.e. one side of the housing 24 does not have a ridge so that it can receive the second side of the decoupling means 4. The ridges 17 forming a housing 24 are arranged so that the housing 24 has a trapezoid shape. Thus, when the second side 12 of a decoupling means is inserted into the housing 24, the trapezoid shape ensures an easy insertion of the second side 12 into the housing 24. Of course, according to this embodiment, the second side of the decoupling means 4 has a trapezoid shape as discussed above with reference to FIG. 2a, so as to cooperate with the housing. The correspondence in shape between the housing 24 and the decoupling means second side 12 enables both ease of assembly and attachment of the single part 26 with the base 2. Moreover, according to FIG. 4a, each ridge 17 has a collar 25. The ridge 17 thus has an L shape. When the base 2 is assembled on the single part 26, each second side 12 of the decoupling means 4 penetrates a housing 24. The shape cooperation between the second side 12 and the collar 25 of each ridge 17 keeps the respective decoupling means 4 in its housing 24. In other words, the decoupling means 4 are inserted by sliding them into the housings 24, and the collars 25 radially hold the decoupling means 4 against the base 2. Certain embodiments of the support device 1 are thus provided with a means for attaching the ring 3 and the base 2 that includes the second sides 12 of the decoupling means 4 slidably received into housings 24 between the housing collars 25 and second face 10.

Figure 5:
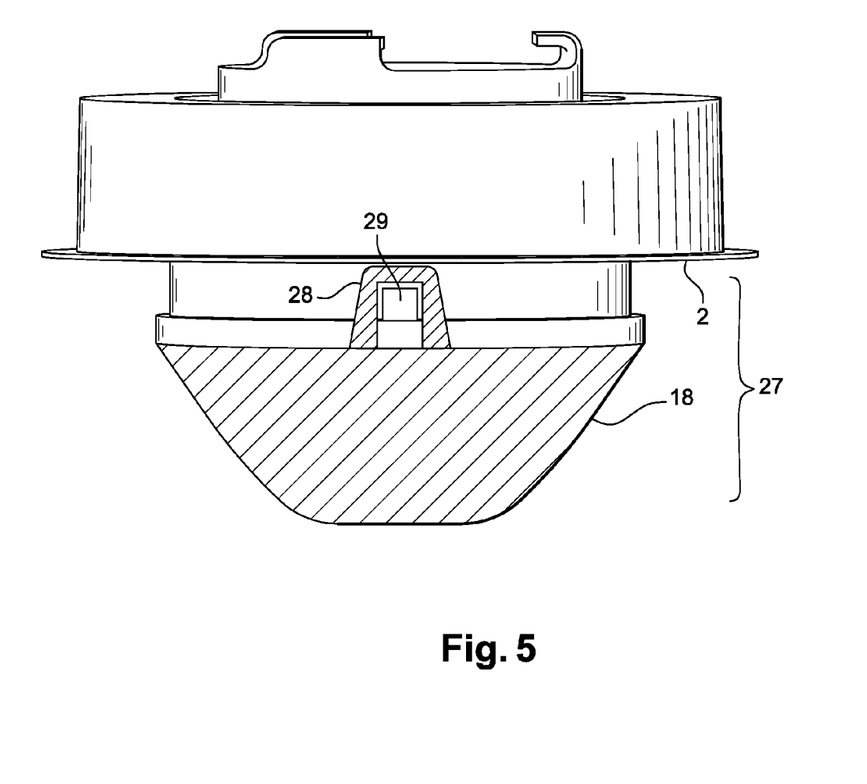
FIG. 5 is a side view of the motor support according to the first embodiment.

FIG. 5 shows the base 2 and a hood 18. The base 2 and the hood 18 of the base 2 form a motor support 27. The hood 18 is a bowl that contains one end of the base 2. The hood 18 comprises at least one tab 28 cooperating with a lug 29 arranged on the base 2. The tab 28 and the lug 29 form means for attaching the base 2 and the hood 18. The fact that the motor support 27 is in two distinct parts enables the motor to be balanced. In this sense, when the support device 1 is formed, namely when the base 2 is attached to the single part 26, the motor is inserted into the ring 3 and is held inside it by means of shoulders 7 and flexible tabs 9. Then, the motor is installed and is held in a testing bench by its motor base or bottom (not shown). The holding of the motor by its motor base or bottom enables the blower wheel to be forced onto the motor shaft. Thus, the support device 1 is not subjected to the forces exerted on the blower wheel and on the motor for the assembly of this wheel. No damage to the support device 1 can occur while it is housing the motor. Finally, the blower wheel is balanced. For this, then motor is implemented and drives the blower wheel. The fact that the support device base 2 is open and that the motor is held by its motor base or bottom in the testing bench means that the support device is not involved in the tests. In this way, the balancing of the blower wheel is not disrupted by the support device including the decoupling means.

According to a second embodiment, the support device 1 substantially as shown is obtained according to a single molding process. First, the ring 3 and the base 2 are formed by molding a first plastic material. Then, the decoupling means 4 are over-molded both on the base 2 and the ring 3. The decoupling means 4 are preferably obtained with a second plastic material, distinct from the first plastic material. In this embodiment, the above-described means for attaching the ring 3 and the base 2 that includes the second sides 12 of the decoupling means 4 slidably received into housings 24 between the housing collars 25 and second face 10 are no longer present, for decoupling means 4 are molded in place relative to both base 2 and ring 3. In addition, the ridges 17 forming a housing 24 entirely surround the second side 12 of the associated decoupling means 4 since it is no longer necessary to insert the decoupling means second side 12 into said housing 24. However, the advantage obtained by the opening of the base 2, over which hood 18 is disposed, in order to attach the motor by its motor base or bottom in a testing bench remains present. It should be noted that this production process is described as "one shot". In other words, this process enables, by using a single molding apparatus, the support device to be obtained in which the base, the ring and the decoupling means form a single part. More specifically, the molding of the base and the ring is performed in the same mold using a first plastic material. Then, a second plastic material is introduced into the same mold in order to form the decoupling means. The decoupling means are then over-molded on the base and the ring, and the latter are still present in the mold during the over-molding of the decoupling means. In this embodiment, the ridges 17 orient the second plastic material toward the housings 24 during the over-molding of the decoupling means. In addition, the trapezoid shape of the housings 24 improves the ease of molding of the decoupling means 4.

According to a third embodiment, the motor support 27 formed by base 2 and hood 18 is made in one piece, obviating the need for the above-discussed means for attaching the base 2 and hood 18 that includes tab 28 and lug 29, but otherwise as shown in FIG. 5. Thus, when the motor is housed in the ring 3 equipped with these decoupling means 4, said decoupling means are inserted into the housings 24 from the base 2 forming a single part with the hood 18. In this embodiment, the performance tests on the motor are performed before the support device 1 is placed on the motor.

With reference to FIG. 5, according to an envisaged fourth embodiment, the support device 1 is capable of housing a two-wheel motor. In this case, the base 2 alone, i.e., without hood 18, forms the motor support 27 and includes means for attaching said support device 1 to the heating, ventilation and/or air-conditioning system.

According to another alternative of the invention, the decoupling means include a single recess 15 on the third side 13. In other words, the fourth side 14 has a planar surface. The decoupling means 4 then has a U shape.

Regardless of the embodiment or alternative envisaged, the following features apply.

The base 2 is formed by a first plastic material. Preferably, the first plastic material is polypropylene. The ring 3 is also formed by this first plastic material.

The decoupling means 4 are formed by a second plastic material. This second plastic material is natural rubber, polypropylene, EPDM or SEBS. It should be noted that the H shape of the decoupling means 4 enables polypropylene, for example, to be used as the second plastic material. Indeed, even though polypropylene does not have good elastic properties compared with those of natural rubber, it can be used to form the decoupling means 4 since the recesses 15 on the third 13 and fourth 14 sides involve flexibility of the decoupling means at the level of the trunk 21.

In addition, the H shape of the decoupling means enable the loss in elastic properties to be overcome when the temperature of the second plastic material is low, for example below 0° C. Thus, when a motor vehicle including a heating, ventilation and/or air-conditioning system equipped with a support device according to the invention is used during the winter, the H shape helps to ensure the three-dimensional decoupling of the motor from the support device 1.

The invention claimed is:

1. A motor support device (1), including a base (2), a ring (3) extending according to an axis (A) and capable of housing a motor with an axis and at least one decoupling means (4) connecting said base (2) and said ring (3), in which said ring (3) has a first face (5) that extends according to the axis (A) of said ring (3), and said base (2) has a second face (10) that extends according to the axis (A) of said ring (3), said decoupling means (4) being interposed between the first (5) and the second (10) faces with said decoupling means (4) configured to decouple said base (2) from movements of the motor, characterized in that said decoupling means (4) has a six-sided shape including a first side (11) in direct contact with said ring (3), a second side (12) in direct contact with said base (2), and a free third side (13) extending substantially radially relative to the axis (A) of said ring (3) between said first and second sides (11, 12), and in that said third side (13) has at least one recess (15) extending in a direction substantially parallel to the axis (A) of said ring (3), wherein said second face (10) of said base (2) includes ridges (17) extending from said second face (10) toward said ring (3) with said ridges (17) defining a plurality of housings (24) for receiving said second side (12) of a respective one of said decoupling means (4) with each of said housings (24) having a trapezoid shape such that each of said housings (24) get narrow along said axis (A) and said second side (12) of said decoupling means (4) having a trapezoid shape for cooperating with said trapezoid shape of said housings (24) to connect said decoupling means (4) to said base (2).

2. A motor support device (1) according to claim 1, in which said decoupling means (4) includes a fourth side (14) having at least one recess (15).

3. A motor support device (1) according to claim 1, in which said decoupling means (4) has an H shape.

4. A motor support device (1) according to claim 3, in which each of said decoupling means (4) of a first radial plane (P1) is offset by an angle (β) of between 0 and 120° with respect to decoupling means (4) of a second radial plane (P2).

5. A motor support device (1) according to claim 3, in which at least two distinct radial planes (P1, P2) each include three decoupling means (4) distributed with an angular offset (α) of 120°.

6. A motor support device (1) according to claim 3, wherein said H shape of said decoupling means (4) includes an inner portion presenting said first side (11), an outer portion presenting said second side (12), and a trunk (21) interconnecting said inner and outer portions with said trunk (21) having a reduced cross-sectional area relative to said inner and outer portions.

7. A motor support device (1) according to claim 6, wherein said trunk (21) comprises a plastic material and is deformable in a direction parallel to the axis (A) to decouple said base (2) from axial movements of the motor parallel to the axis (A).

8. A motor support device (1) according to claim 1, in which at least two decoupling means (4) are distributed according to at least two distinct radial planes (P1, P2).

9. A motor support device (1) according to claim 8, in which the radial planes (P1, P2) are located one with respect to the other so that between them is the center of gravity location of a motor said ring (3) is capable of housing.

10. A motor support device (1) according to claim 8, in which each of said decoupling means (4) of a first radial plane (P1) is offset by an angle (β) of between 0 and 120° with respect to decoupling means (4) of a second radial plane (P2).

11. A motor support device (1) according to claim 1, including six decoupling means (4).

12. A motor support device (1) according to claim 1, in which a hood (18) is associated with said base (2) in order to form a motor support (27).

13. A motor support device (1) according to claim 12, in which said hood (18) and said base (2) are made in one piece.

14. A motor support device (1) according to claim 1, in which said base (2), said ring (3) and said decoupling means (4) form a single part.

15. A motor support device (1) according to claim 14, which is plastic.

16. A motor support device (1) according to claim 1, wherein said decoupling means (4) comprises a plastic material.

17. A motor support device (1) according to claim 16, wherein said plastic material is rubber.

18. A process for producing a motor support device (1), which includes a base (2), a ring (3) extending according to an axis (A) and capable of housing a motor with an axis and at least one decoupling means (4) connecting the base (2) and the ring (3), in which the ring (3) has a first face (5) that extends according to the axis (A) of the ring (3), and the base (2) has a second face (10) that extends according to the axis (A) of the ring (3), the decoupling means (4) being interposed between the first (5) and the second (10) faces with the decoupling means (4) configured to decouple the base (2) from movements of the motor, characterized in that the decoupling means (4) has a six-sided shape including a first side (11) in direct contact with the ring (3), a second side (12) in direct contact with the base (2), and a free third side (13) extending substantially radially relative to the axis (A) of the ring (3) between the first and second sides (11, 12), and in that the third side (13) has at least one recess (15) extending in a direction substantially parallel to the axis (A) of the ring (3), wherein the second face (10) of the base (2) includes ridges (17) extending from the second face (10) toward the ring (3) with the ridges (17) defining a plurality of housings (24) for receiving the second side (12) of a respective one of the decoupling means (4) with each of the housings (24) having a trapezoid shape such that each of the housings (24) get narrow along the axis (A) and the second side (12) of the decoupling means (4) having a trapezoid shape for cooperating with the trapezoid shape of the housings (24) to connect the decoupling means (4) to the base (2), with the base (2), the ring (3) and the decoupling means (4) forming a single part, said process comprising the following steps:
  a) molding in a single molding apparatus the ring (3) and the base (2) with a first plastic material,
  b) over-molding in the single molding apparatus the decoupling means (4) to both the ring (3) and to the base (2) and forming the at least one recess (15) extending in a direction substantially parallel to the axis (A) of the ring (3) in the free third side (13) of the decoupling means (4) with a second plastic material, and
  c) separating the motor support device (1) as a single part from the single molding apparatus.

* * * * *